US009727870B2

(12) United States Patent
Ku

(10) Patent No.: US 9,727,870 B2
(45) Date of Patent: Aug. 8, 2017

(54) SYSTEM AND METHOD FOR LINK OF UPPER SHOPPING MALL AND INDEPENDENT SHOPPING MALL USING API METHOD

(75) Inventor: Young Bae Ku, Seoul (KR)

(73) Assignee: eBay Inc., San Jose, CA (US)

( * ) Notice: Subject to any disclaimer, the term of this patent is extended or adjusted under 35 U.S.C. 154(b) by 880 days.

(21) Appl. No.: 12/303,298

(22) PCT Filed: Jun. 22, 2007

(86) PCT No.: PCT/KR2007/003029
§ 371 (c)(1),
(2), (4) Date: Feb. 4, 2009

(87) PCT Pub. No.: WO2007/148937
PCT Pub. Date: Dec. 27, 2007

(65) Prior Publication Data
US 2010/0280900 A1 Nov. 4, 2010

(30) Foreign Application Priority Data

Jun. 23, 2006 (KR) .......................... 10-2006-0056981

(51) Int. Cl.
*G06Q 30/00* (2012.01)
*G06F 17/30* (2006.01)
*G06Q 30/02* (2012.01)

(52) U.S. Cl.
CPC .......... *G06Q 30/00* (2013.01); *G06Q 30/0239* (2013.01)

(58) Field of Classification Search
CPC ............................ G06Q 30/00; G06Q 30/0239
(Continued)

(56) References Cited

U.S. PATENT DOCUMENTS 5,970,474 A * 10/1999 LeRoy et al. ................... 705/27
7,373,319 B2 * 5/2008 Kopelman et al. .......... 705/26.1
(Continued)

FOREIGN PATENT DOCUMENTS

KR 10-2000-0049418 8/2000
KR 10-2002-0007871 1/2002
(Continued)

OTHER PUBLICATIONS

Netscape internet applications family for electronic commerc. (May 1995). Information Today, 12, 30. Retrieved from https://search.proquest.com/docview/214815237?accountid=14753.*

*Primary Examiner* — Kathleen Palavecino
(74) *Attorney, Agent, or Firm* — Schwegman Lundberg & Woessner, P.A.

(57) ABSTRACT

The present invention relates to a link system and link method of an upper shopping mall and an independent shopping mall of API (application programming interface) link method, in particular, to a technology that builds and manages an independent shopping mall having an independent domain address and an user interface besides the upper shopping mall which is registered together with the other sellers. According to the present invention, provided is a link system of an upper shopping mall having a plurality of sellers and an independent shopping mall operated independently by one person among the sellers, of API link method, which comprises a shopping mall database that stores a goods information, a member information, and a payment and delivery information; an independent shopping mall web server receives a goods inquiry or a purchase request from a user to output a factor for extracting data of the shopping mall database, and receives a necessary data from the shopping mall database; and an API server receives a factor from the independent shopping mall web server to analyze, and accesses to the shopping mall database so as to
(Continued)

request that the necessary data should be sent to the independent shopping mall web server.

8 Claims, 1 Drawing Sheet

(58) Field of Classification Search
USPC .................................................. 705/26–27
See application file for complete search history.

(56) References Cited

U.S. PATENT DOCUMENTS

| 2001/0056377 | A1* | 12/2001 | Kondoh et al. ................. | 705/26 |
| 2002/0010647 | A1* | 1/2002 | Kim ................................ | 705/26 |
| 2002/0023007 | A1* | 2/2002 | Lee ................................. | 705/26 |
| 2003/0154135 | A1* | 8/2003 | Covington et al. ............. | 705/26 |
| 2003/0177111 | A1* | 9/2003 | Egendorf et al. ................ | 707/3 |
| 2003/0225630 | A1* | 12/2003 | Kakuta ........................... | 705/26 |
| 2007/0150357 | A1* | 6/2007 | Shin ............................... | 705/26 |

FOREIGN PATENT DOCUMENTS

| KR | 10-2005-0112015 | 11/2005 |
| KR | 10-2006-0016874 | 2/2006 |

* cited by examiner

SYSTEM AND METHOD FOR LINK OF UPPER SHOPPING MALL AND INDEPENDENT SHOPPING MALL USING API METHOD

CROSS-REFERENCE TO RELATED APPLICATION

This application is the U.S. national stage application of International Patent Application No. PCT/KR2007/003029, filed Jun. 22, 2007, the disclosure of which is hereby incorporated by reference in its entirety.

TECHNICAL FIELD

The present invention relates to a link system and link method of an upper shopping mall and an independent shopping mall of API (application programming interface) link method, in particular, to a technology that builds and manages an independent shopping mall having an independent domain address and an user interface besides the upper shopping mall which is registered together with the other sellers.

BACKGROUND ART

Conventionally, there has been a technology of method and system for generating and parceling-out a lower shopping mall in an upper shopping mall, however, such technology had many problems (refer to Korea Published Patent NO. 2005-0112015, Korea Published Patent NO. 2003-0071732).

The related art reproduced a goods database that the upper shopping mall already has, or adopted a mode that builds the lower shopping mall by directly approaching to the upper shopping mall database.

However, in case of the mode of reproducing the goods database, the synchronization with the other side was not performed on a real time basis when the database of one side was updated, but the task for the synchronization has to be separately worked in a constant cycle. Therefore, there has been a problem in that the side effect including a temporary data omission or the waste of system resources can not be evaded.

Additionally, in case of the mode of directly approaching to the database of the upper shopping mall, there has been a problem in that the danger of the security has to be accepted due to the database access of the lower shopping malls, or the lower shopping mall configuration and the self-control of an operation are seriously trespassed on by considerably blocking the access of the lower shopping mall account in order to avoid that.

Additionally, in the other shopping mall parceling-out solution, the mode that forms a unique database of the lower shopping mall is adopted without the link of the lower shopping mall and the upper shopping mall. However, such mode has a problem that it cannot help accepting a considerable burden of cost in that sellers have to separately manage both the upper shopping mall and the lower shopping mall.

DISCLOSURE OF INVENTION

Technical Problem

Accordingly, an object of the present invention is to solve at least the problems and disadvantages of the related art. An object of the present invention is to provide a link system and link method of an upper shopping mall and an independent shopping mall capable of solving the security problem according to the common database by using the API link method and intensifying the individuality of the lower shopping mall.

Technical Solution

In order to accomplish the object, according to the present invention, provided is a link system of an upper shopping mall having a plurality of sellers and an independent shopping mall operated independently by one person among the sellers, of API link method, which comprises a shopping mall database that stores a goods information, a member information, and a payment and delivery information; an independent shopping mall web server receives a goods inquiry or a purchase request from a user to output a factor for extracting data of the shopping mall database, and receives a necessary data from the shopping mall database; and an API server receives a factor from the independent shopping mall web server to analyze, and accesses to the shopping mall database so as to request that the necessary data should be sent to the independent shopping mall web server.

Additionally, provided is a link method of an upper shopping mall and an independent shopping mall of the API link method, which comprises performing a seller registration, and performing a goods registration in an upper shopping mall web server; receiving an independent shopping mall construction application from the registered seller; establishing an independent shopping mall according to the independent shopping mall construction application; receiving a goods inquiry or a purchase request from a user in an independent shopping mall web server, and outputting a factor for extracting the data of a shopping mall database; requesting the sending of a necessary data by accessing to the shopping mall database, after receiving and analyzing the factor from the independent shopping mall web server in an API server; and receiving the necessary data from the shopping mall database in the independent shopping mall web server.

DESCRIPTION OF REFERENCE CHARACTERS OF PRINCIPAL ELEMENTS

10: upper shopping mall web server.
20: shopping mall database.
21: goods database.
22: member information database.
23: payment and delivery information database.
30: independent shopping mall web server.
40: API server.

BEST MODE FOR CARRYING OUT THE INVENTION

Figure 1:
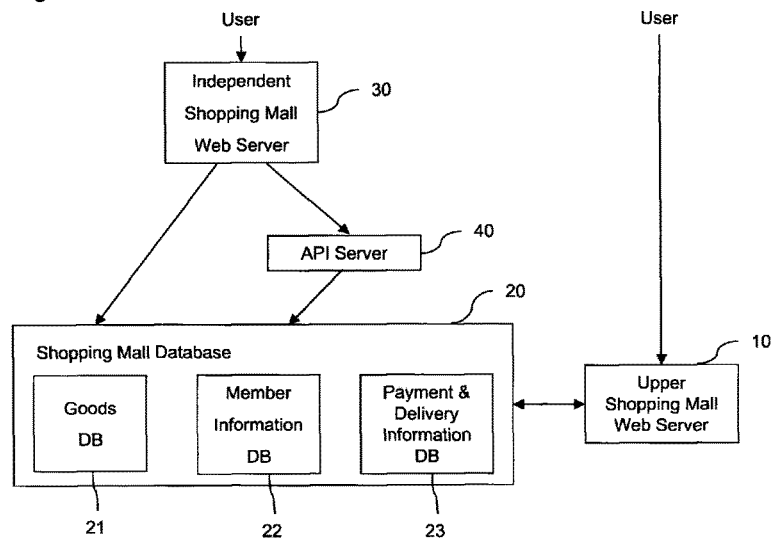
FIG. 1 is a block diagram showing a system for linking an upper shopping mall and an independent shopping mall according to an embodiment of the present invention.

FIG. 1 is a block diagram showing a system for linking an upper shopping mall and an independent shopping mall according to an embodiment of the present invention.

Referring to FIG. 1, the system for linking the upper shopping mall and the independent shopping mall is comprised of an upper shopping mall web server 10, a shopping mall database 20, an independent shopping mall web server 30, and an API server 40.

The upper shopping mall web server 10 receives the seller registration, the goods registration and receives an independent shopping mall construction application from a registered seller.

The shopping mall database 20 includes a goods database 21 which stores a goods information, a member information database 22 which stores a member information, and a payment and delivery information database 23 which stores a payment and delivery information.

The shopping mall database 20 can manage the member information while a user who became a member through the independent shopping mall is indicated with a separate identifier. Through this, a discriminated marketing method can be applied to the user who became a member through the independent shopping mall after a filtering.

The shopping mall database 20 can manage the payment information for the payment generated through the independent shopping mall with a separate identifier for indicating. Through this, it can be utilized as a basic material for an inflow path analysis or a visitor behavior analysis.

The independent shopping mall web server 30 receives a goods inquiry or a purchase request from a user and outputs a factor for extracting data of the shopping mall database 20 to the API server 40, while a necessary data is delivered from the shopping mall database 20.

The factor can include a corresponding seller ID, a field data for goods information searching, and a member information ID.

The independent shopping mall web server 30 can perform the generic functionality of an internet shopping mall including user membership join.

The independent shopping mall web server 30 can receive data from the shopping mall database 20 with XML or HTML format, and can convert it into an output form which is suitable for the interface of the independent shopping mall for output. Through this, datas are relocated with a desired form after receiving necessary data and can output them. In that way, the unique user interface of the independent shopping mall can be built through a skin editing.

The independent shopping mall web server 30 can apply a separate discount rate to the price information of goods information data delivered from the shopping mall database 20 or can issue a separate discount coupon. Through this, the unique price policy of the independent shopping mall can be organized.

The API server 40, after receiving and analyzing the factor from the independent shopping mall web server 30, accesses to the shopping mall database 20 and requests the transmission of necessary data.

The independent shopping mall web server 30 can obtain only the information relates to the corresponding seller or user by using the API server 40, thereby, the security problem according to the common database can be solved.

Figure 2:
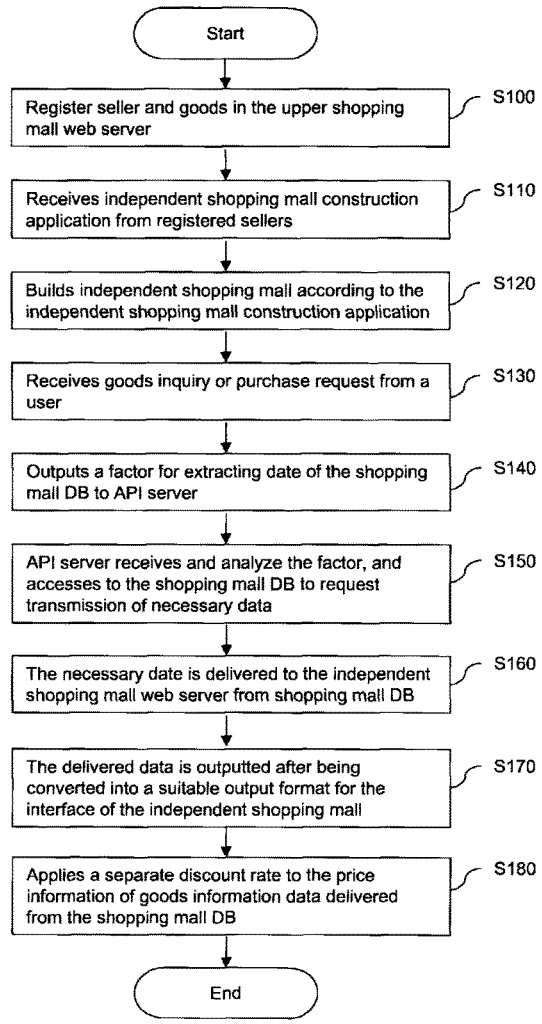
FIG. 2 is a flowchart showing a method for linking an upper shopping mall and an independent shopping mall according to an embodiment of the present invention.

FIG. 2 is a flowchart showing a method for linking an upper shopping mall and an independent shopping mall according to an embodiment of the present invention.

Referring to FIG. 2, in the upper shopping mall web server 10, the seller registration and the goods registration are performed S100.

An independent shopping mall construction application is received from the registered seller S110.

According to the independent shopping mall construction application, the independent shopping mall is built S120.

The independent shopping mall construction can be made by setting up an independence account, and by copying a file required for the shopping mall construction into the corresponding accounts.

The independent shopping mall web server 30 receives a goods inquiry or a purchase request from a user S130.

The independent shopping mall web server 30 outputs a factor for extracting data of the shopping mall database 20 to API server 40 S140.

The factor can include a corresponding seller ID, a field data for goods information searching, and a member information ID.

After receiving and analyzing the factor from the independent shopping mall web server 30, API server 40 accesses to the shopping mall database 20 and requests the transmission of necessary data S150.

Necessary data are delivered to the independent shopping mall web server 30 from the shopping mall database 20 S160. The independent shopping mall web server 30 can receive data from the shopping mall database 20 with XML or HTML format.

Data that the independent shopping mall web server 30 is delivered from the shopping mall database 20 is converted into an output form which is suitable for the interface of the independent shopping mall to output S170.

The independent shopping mall web server 30 applies a separate discount rate to the price information of goods information data delivered from the shopping mall database 20 S180.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

According to the present invention, the effect of a link system and link method of an upper shopping mall and an independent shopping mall of API link method is as follows:

First, the independent shopping mall web server can obtain only the information relates to the corresponding seller by using API link method, thereby, the security problem according to the common database can be solved.

Second, data that the independent shopping mall web server is delivered from the shopping mall database can be freely converted such that various user interfaces can be provided.

Third, in case of the information relating to the independent shopping mall, a separate identifier is provided when storing data in the shopping mall database, thereby, a marketing method for only the independent shopping mall can be implemented through the filtering method. Accordingly, the individuality of the independent shopping mall can be more strengthened.

The invention claimed is:

1. A method comprising:
    performing a seller registration for a user, and performing a goods registration in a first web server having a plurality of users, the user being one of the plurality of users;
    receiving, in the first web server, a second web server construction application from the user;

establishing a website on the second web server according to the second web server construction application, the second web server being independently operated from the first web server by the user, the second web server having a different domain name than the first web server;

receiving a purchase request from a member of the website on the second web server;

responsive to receiving the purchase request, outputting, by the second web server, a factor for extracting data from a database of the first web server;

receiving and analyzing, via an Application Programming Interface (API) server, the factor from the second web server, the API server being a different server than the first web server and the second web server;

in response to analyzing the factor, requesting, via the API server, necessary data from the database, only a portion of the data in the database that is related to the one of the plurality of users is accessible by the second web server through the API server;

receiving, in the second web server, the necessary data from the database of the first web server;

applying a separate discount rate from a rate applied by the first web server, the separate discount rate applied to price information of goods information data received from the database, the rate applied via the second web server; and indicating, by the database, a user who became a member through the website with a first separate identifier to manage member information, and a second separate identifier to manage payment information.

2. The method of claim 1, wherein the factor includes a corresponding seller ID and a field data for goods information searching.

3. The method of claim 1, wherein the second web server receives data from the database in XML or HTML format.

4. The method of claim 1, further comprising:
converting data from the database into an output form suitable for an interface of the website.

5. A non-transitory machine-readable storage device embodying instructions that, when executed by a machine, cause the machine to perform the operations comprising:
performing a seller registration for a user, and performing a goods registration in a first web server having a plurality of users, the user being one of the plurality of users;

receiving, in the first web server, a second web server construction application from the user;

establishing a website on the second web server according to the second web server construction application, the second web server being independently operated from the first web server by the user, the second web server having a different domain name than the first web server;

receiving a purchase request from a member of the website on the second web server;

responsive to receiving the purchase request, outputting, by the second web server, a factor for extracting data from a database of the first web server;

receiving and analyzing, via an Application Programming Interface (API) server, the factor from the second web server, the API server being a different server than the first web server and the second web server;

in response to analyzing the factor, requesting, via the API server, necessary data from the database, only a portion of the data in the database that is related to the one of the plurality of users is accessible by the second web server through the API server;

receiving, in the second web server, the necessary data from the database of the first web server;

applying a separate discount rate from a rate applied by the first web server, the separate discount rate applied to price information of goods information data received from the database, the rate applied via the second web server; and indicating, by the database, a user who became a member through the website with a first separate identifier to manage member information, and a second separate identifier to manage payment information.

6. The non-transitory machine-readable storage device of claim 5, wherein the factor includes a corresponding seller identifier (ID) and a field data for goods information searching.

7. The non-transitory machine-readable storage device of claim 5, wherein the second web server receives data from the database in XML or HTML format.

8. The non-transitory machine-readable storage device of claim 5, further comprising:
converting data from the database into an output form suitable for an interface of the website.

* * * * *

UNITED STATES PATENT AND TRADEMARK OFFICE
CERTIFICATE OF CORRECTION

PATENT NO. : 9,727,870 B2
APPLICATION NO. : 12/303298
DATED : August 8, 2017
INVENTOR(S) : Young Bae Ku It is certified that error appears in the above-identified patent and that said Letters Patent is hereby corrected as shown below:

On the Title Page

In item (56), in Column 2, under "Other Publications", Line 1, delete "commerc." and insert -- commerce. --, therefor.

In the Claims

In Column 4, Line 61, in Claim 1, after "A" insert -- link --.

Signed and Sealed this
Third Day of July, 2018

Andrei Iancu
*Director of the United States Patent and Trademark Office*